United States Patent [19]

Fujioka et al.

[11] 3,850,461
[45] Nov. 26, 1974

[54] THREADED TUBE JOINT STRUCTURE FOR A CASING

[75] Inventors: Yasuhide Fujioka; Takeshi Ryujin, both of Kainan; Shuji Yoshida; Mitami Inagaki, both of Wakayama, all of Japan

[73] Assignees: Kainan Steel Tube Co., Ltd., Kainan; Sumitomo Metal Industries Limited, Osaka, Japan

[22] Filed: Mar. 30, 1973

[21] Appl. No.: 346,303

[30] Foreign Application Priority Data
Mar. 31, 1972 Japan.............................. 47-32954
Mar. 31, 1972 Japan.............................. 47-32959

[52] U.S. Cl. ............................................ 285/322.2
[51] Int. Cl............................................... F16l 25/00
[58] Field of Search............. 283/332.2, 332.3, 333, 283/334

[56] References Cited
UNITED STATES PATENTS

| | | | |
|---|---|---|---|
| 2,062,407 | 12/1936 | Eaton................................. | 285/334 |
| 3,224,799 | 12/1965 | Blose et al......................... | 285/334 |
| 3,508,771 | 4/1970 | Duret................................. | 285/334 |
| 3,658,368 | 4/1972 | Hokanson.......................... | 285/333 |

FOREIGN PATENTS OR APPLICATIONS
866,996  5/1961  Great Britain..................... 285/334

*Primary Examiner*—Alfred R. Guest
*Attorney, Agent, or Firm*—Watson, Cole, Grindle & Watson

[57] ABSTRACT

A threaded tube joint having a seal structure consisting of a metal-to-metal forced contact seal which also serves to augment the sealing effect of a tetrafluroethylene packing by holding it under an extremely high pressure so as to effect a tighter combined seal.

4 Claims, 5 Drawing Figures

THREADED TUBE JOINT STRUCTURE FOR A CASING

This invention relates to threaded connections for tubular products such as are extensively used in the oil and gas industry in connection with the exploitation of underground deposits of natural resources such as oil and gas.

The conditions under which tubing is used and the requirements of such tubing have been getting progressively severe over the years. Natural oil and gas wells currently being driven are extended to depths in excess of 5,000 meters, and the type of thread of the tubular products employed for such wells has undergone changes through many years, with various new types of threaded tube joints having been developed and actually used. It will be understood that in a length of tubing extending to a depth in excess of 5,000 meters, the uppermost tube joint must withstand the total weight of the tubing even when no external force is exerted, and even if the tubing is simply suspended. Since the ordinary tubing commonly used today weighs 6 to 50 kilograms per meter of the tubing length, the threads are subjected to tremendous loads. If the tubing is also used for the purpose of drilling the well, the coupling must be able to withstand high torque loads in addition to the tensile load.

One difficulty encountered with tubing is that when it is subjected to a great axial tension load, the coupling between mating threaded elements tends to become loose, thereby adversely affecting the leaktight property of the coupling. Therefore improvements in the seal connection of the threaded tube joints become necessary.

It has been known and is disclosed, for example, in U.S. Pat. No. 3,210,096 and in U.S. Pat. No. 3,224,799 to seal against leakage between mating threaded elements, i.e., through a threaded tube joint by providing during assembly of the coupling a material-to-metal seal with interfitting or interengaging faces of the male and female threaded elements of the coupling. In this joint structure, the end face of the end portion (or lip) of the male or female threaded element constituting the metal-to metal seal lies in a plane normal to the tubing axis, and the mating face of the other threaded element also lies in a plane normal to the tubing axis, the mating face of the latter element serving as a stop shoulder to prevent excessive tightening.

It is also known and disclosed, for example, in U.S. Pat. No. 2,992,019 and in British patent specification No. 1,220,856, to form a metal-to-metal seal during assembly of the threaded joint elements between a frusto-conical outer surface of the lip of the male threaded element and a corresponding inner frusto-conical surface of the other element, one of the interengaging frusto-conical surfaces having a linear profile and the other surface being spherical or having an arcuate profile. Further, it is known and disclosed, for example, in U.S. Pat. No. 3,047,316, in U.S. Pat. in NO. 2,907,589 and U.S. No. in No. 2,980,451 to incorporate a packing of material such as tetrafluroethylene as a seal member in the threaded joint.

However, in these known threaded joint structures the end face of the male threaded member and the mating face of the female threaded member either lie in a plane normal to the tubing axis or lie in a conical surface including the tubing axis. Therefore, the contact pressure obtainable by interengaging these surfaces is relatively low and tends to be insufficient even if these surfaces are urged against each other with a very strong make-up force because the contact obtained is no other than an area contact. Such low contact pressure at the end of the male threaded member is insufficient to seal against leakage of fluid. Also, a sufficient sealing effect cannot be obtained with the known structure using the tetrafluoroethylene packing inserted between the interfitted threaded members at one or other locality therein.

With the above considerations in mind, it is the primary object of this invention to provide a unique threaded joint structure, which has a first seal of metal-to-metal contact formed during assembly of the joint between an inner flaring surface of a coupler or box member extending forwardly of the female threaded, and a tapered outer surface of a forward end portion of a tubing section or pin member extending forwardly of the male thread, and which also has a second seal formed with a tetrafluoroethylene packing at forward end portion of the male thread.

Another object of this invention is to provide a threaded joint structure which has, in addition to the afore-mentioned first and second seals, a third seal of metal-to-metal forced contact between the end face of the forward end portion of the tubing section, and a stopper surface of an inner projection or shoulder of the coupling.

A further object of this invention is to provide a novel threaded tube joint structure having three seals, the first one of the seals being formed by a metal-to-metal forced contact between the forward side wall surface of an inner annular groove formed in the coupling to receive the tetrafluoroethylene packing, said forward side wall surface being nearer to the center of the coupling, and a forward end portion of the male thread formed in the tubing section and terminating in the end portion thereof, the second seal being formed with the tetrafluoroethylene packing at the forward end portion of the male thread, and the third seal being formed by a metal-to-metal forced contact between the end portion or lip of the tubing section, said lip covering an axial dimension no greater than 1 to 2 times the thread pitch, and the corresponding portion of the coupling.

It will be apparent from the above objects of this invention that one of the features of this invention is that the sealing effect of the tetrafluoroethylene packing is extremely augmented as it is held under an extremely high pressure by virtue of a firm seal of metal-to-metal forced contact, so that the combined seal is more perfect that any other seal obtainable with any prior-art threaded tube joint.

Figure 1:
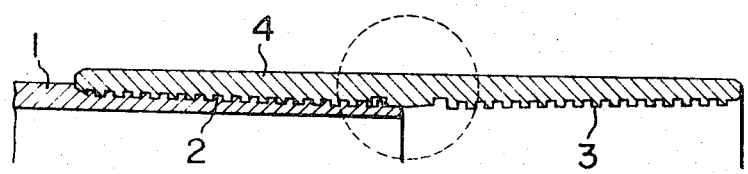
FIG. 1 is a fragmentary sectional view illustrating a threaded tube joint using a coupling according to this invention, only the left hand tubing section being shown coupled to the coupling.
Figure 2:
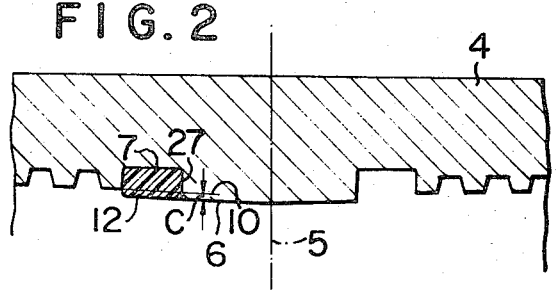
FIG. 2 is a fragmentary sectional view, to an enlarged scale, showing a central portion of the coupling as enclosed by a dashed circle in FIG. 1.
Figure 3:
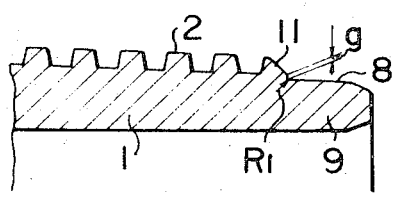
FIG. 3 is a fragmentary sectional view, to an enlarged scale, showing a portion of the tubular section including the lip thereof as enclosed by the dashed circle in FIG. 1.

Referring to the drawing, FIG. 1 shows a coupling whose left hand half and a left hand tubing section are shown connected, and FIGS. 2 and 3 show the coupling and tubing section to an enlarged scale.

The illustrated joint comprises a threaded end portion of the tubing section 1 and the mating portion of the coupling 4, the former constituting a pin or male threaded member with a buttless thread conforming to the API standard cut over a tapered portion tapering generally at a taper ratio of 1/16. and the latter constituting a box or female threaded member with a female thread conforming to the API standard cut over a complementary taper portion tapered at the same taper ratio. The inner diameter of the coupling 4 is reduced toward the center thereof. In other words, the coupling 4 internally tapers or flares such that it has a maximum wall thickness and a minimum inner diameter at its center or mid way between its opposite ends.

According to this invention, the coupling or box element 4 has a central portion with no thread and (at least) covering an axial 1/16 taper dimension indicated at 6 corresponding to 1 to 2 times the thread pitch on either side of its center, the central portion terminating at either end in an annular groove 7 to receive a packing and covering an axial dimension corresponding to 1 to 1.5 times the thread pitch. The API standard buttless female thread is cut over the portion extending outwardly or backwardly of each annular groove 7. The tubing section or pin element 1 has an end portion or lip 9 with no thread formed thereon and covering an axial 1/16 taper dimension corresponding to 1 to 2 times the thread pitch of the male thread. The outer surface 8 of the lip and the mating inner surface 6 of the coupling are machined to have the same taper ratio so as to obtain a close area contact between them. Also, for the purpose of obtaining a close forced contact between these surfaces the thickness of the central portion 6 is increased by an extra amount C with respect to the extension 10 of the line representing the top profile of the female thread of the coupling 4, that is, with respect to the radial dimension of the tapered surface of the lip 8. From theoretical calculations this thickness quantity C is suitably 0.05 to 0.20 mm. However, considering the precision of machining the threads and the precision in assembling and making up the joint, it is more practical to select this value from a range between 0.10 to 0.40 mm. As the tubing section is threaded into the coupling the forward end of the male thread 11 encounters the packing 12, which may be a tetrafluoethylene packing, and compresses it against the bottom of the groove 7. With a further advancement of the tube 1 the lip 9 thereof eventually strides the groove 7, and the frictional engagement between the outer surface 6 of the lip and the inner surface 8 of the coupling is brought about. Since the radial dimension of the coupling surface 6 is reduced by the amount C, the contact pressure between the two interengaged surfaces 6 and 8 is progressively increased as the lip 9 is rotatingly advanced by exerting progressively increasing torque surpassing the friction between the two surfaces. Thus, a perfect metal-to-metal area contact with a contact pressure higher than that on the tetrafluoroethylene packing may be obtained when the tubing section is brought to the final intended position at the end of the assembly operation. The length or axial dimension of the final contact area, i.e., the area of contact between the surfaces 6 and 8, should not be in excess of a limit corresponding to 1 to 2 times the thread pitch lest the lip should buckle or undergo permanent deformation. Also, both the interengaged portions should be made as thick as possible.

The threaded tube joint structure according to this invention has another feature as will be described in connection with the embodiment of FIGS. 2 and 3. Here, contact between the side wall 27 of the packing groove 7 on the side nearer the center 5 of the coupling 4 in FIG. 2 and the forward end 11 of the thread of the tubing section in FIG. 3 is made particularly perfect. This is achieved by providing a perpendicular stem portion as indicated at g at the forward end thread portion. With this construction, even though the forward end portion of the thread may be imperfect, its perpendicular stem portion g can make a perfect area contact with the corresponding corner area of the side wall surface 27 of the packing groove 7, and with this metal-to-metal area contact a firm stopper action can be obtained. Thus, an extremely high pressure can be exerted to the sealed packing, and leakage through this area can be absolutely eliminated. Experiments proved that the most effective height dimension of the stem portion g is substantially independent of the size of the joint and is somewhere between 0.40 and 0.80 mm insofar as the thread is the buttless thread confirming to the API standard.

Figure 4:
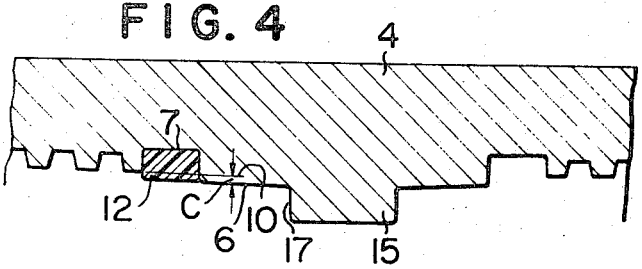
FIGS. 4 and 5 are views respectively similar to FIGS. 2 and 3 but showing corresponding threaded elements in a different embodiment of the threaded tube joint structure according to this invention.
Figure 5:
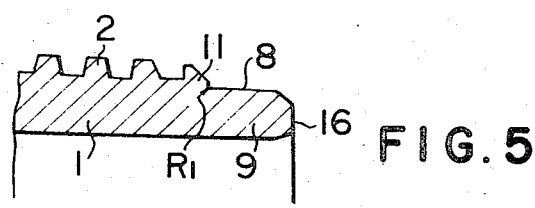

FIGS. 4 and 5 show another embodiment of the threaded joint structure according to this invention. This embodiment is basically the same as the preceding one except that the coupling 4 in this embodiment has an inner central shoulder 15, which is adapted to form a third seal as it is engaged by the lip 9 of the connected tubing section. Each side of the shoulder 15 serves as a stopper as indicated at 17, which is adapted to be engaged by end face 16 of the lip 9 at the end of the assembly after the completion of the afore-mentioned first and second seals. Thus, the assembly can be completed upon detecting a sudden increase of the exerted torque upon engagement between lip end 16 and stopper 17. In this way, not only a further powerful seal structure can be obtained with the addition of the third metal-to-metal contact seal to the previously mentioned fist and second seals, but also it is an advantage to be able to detect the end of the assembly operation from the increase of the exerted torque from the standpoint of rationalizing the field operation control. While the third seal in the embodiment FIGS. 4 and 5 is the area contact seal of the simplest type formed with two planar or flat surfaces, it is possible to obtain unique and additional effects by modifying the sealing surfaces. For example, it may be of a slidable contact type formed with spherical or flat surfaces or a combination thereof, or it may consist of interengaging convex and concave surfaces.

As has been described in the foregoing, with the threaded tube joint structure according to this invention, in which a forced metal-to-metal area contact and, if necessary, an additional metal-to-metal contact between stopper 17 constituted by the inner central shoulder provided to the coupler and end face 16 of the lip of the tubing section are provided to a leak-tight seal between the threaded element in addition to the seal with the packing, it is possible to obtain a seal more perfect and effective than the seal obtainable with prior-art tube joints, and to ensure a superior leakage-tight performance of the tube joint.

What is claimed is:

1. A threaded tube joint for a casing, comprising a tapered male-threaded portion of a metal tubing section, and a metal tubular coupler having a female thread thereon in threaded engagement with said male-threaded portion, said coupler having an inner flaring threadless surface portion extending parallel to and toward said tubing section by a constant amount from the taper profile formed at the crest of the female threads, said coupler also having an annular inner groove located between said inner flaring surface and the forwardmost thread of said coupler, a packing of tetrafluoroethylene located within said groove, said tubing section having threadless forward end portion of the same taper as that of said flaring surface of said coupler, and a forward side wall surface of said groove nearer the center of said coupler being in metal-to-metal force contact with a forward end portion of the forwardmost thread of said tubing section, a first metal-to-metal seal being formed between said threadless surface portion and said threadless forward end portion, and a second seal being formed between said packing and said forwardmost thread of said tubing section.

2. The threaded tube joint according to claim 1, wherein the constant amount extension of said threadless surface portion is within a range of between 0.10 and 0.40 millimeters, and has an axial dimension within a range of 1 to 2 times the thread pitch.

3. The threaded tube joint according to claim 1, wherein said forwardmost thread of said tubing section is partially tapered away from said forward side wall surface of said groove.

4. The threaded tube joint according to claim 1, wherein said coupler has an inner annular projection at said center, said projection defining a stopper surface, whereby a third metal-to-metal forced contact seal is formed between the end face of said tubing section forward end portion and said stopper surface.

* * * * *